(12) United States Patent
Cao et al.

(10) Patent No.: US 12,235,810 B2
(45) Date of Patent: Feb. 25, 2025

(54) EFFICIENT STORAGE OF KEY-VALUE DATA WITH SCHEMA INTEGRATION

(71) Applicant: Dell Products L.P., Round Rock, TX (US)

(72) Inventors: Wei Cao, Shanghai (CN); Hao Wang, Shanghai (CN); Nicholas Chun Wei, Shanghai (CN); Kshitij Patel, Cary, NC (US); Xueyun Li, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 278 days.

(21) Appl. No.: 17/125,086

(22) Filed: Dec. 17, 2020

(65) Prior Publication Data

US 2022/0197874 A1 Jun. 23, 2022

(51) Int. Cl.
G06F 16/21 (2019.01)
G06F 3/06 (2006.01)

(52) U.S. Cl.
CPC .......... *G06F 16/211* (2019.01); *G06F 3/0604* (2013.01); *G06F 3/0629* (2013.01); *G06F 3/0653* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 7,574,699 B1* | 8/2009 | Simmons | G06F 8/4434 717/136 |
| 7,689,587 B1* | 3/2010 | Tiruveedi | G06F 16/211 707/803 |
| 8,571,882 B1* | 10/2013 | Teitelbaum | G06F 12/0866 705/2 |
| 9,424,289 B2* | 8/2016 | Cornish | G06F 16/119 |
| 10,169,169 B1* | 1/2019 | Shaikh | G06F 11/2094 |
| 10,909,091 B1* | 2/2021 | Shah | G06F 16/211 |
| 11,138,164 B1* | 10/2021 | Munuhur Rajagopal | G06F 16/213 |
| 2007/0299858 A1* | 12/2007 | Norcott | G06F 16/211 707/999.102 |
| 2008/0071817 A1* | 3/2008 | Gaurav | H04L 67/56 |
| 2008/0077632 A1* | 3/2008 | Tysowski | G06F 16/2358 |
| 2013/0311443 A1* | 11/2013 | Bolotnikoff | G06F 16/211 707/756 |
| 2014/0280366 A1* | 9/2014 | Li | G06F 16/254 707/803 |

(Continued)

*Primary Examiner* — Kavita Stanley
*Assistant Examiner* — Cao D Vuong
(74) *Attorney, Agent, or Firm* — Ryan, Mason & Lewis, LLP (57) ABSTRACT

Methods, apparatus, and processor-readable storage media for efficient storage of key-value data with schema integration are provided herein. An example computer-implemented method includes obtaining a metrics data message associated with a product, wherein the metrics data message has a first format and comprises a schema version and a type of the product; identifying one of a plurality of schema definitions for the metrics data message based at least in part on the schema version and the type of the product; converting the metrics data message into a second format based on the identified schema definition, wherein the second format removes at least some redundant data from the metrics data message; and storing the converted metrics data message in a metrics database.

20 Claims, 6 Drawing Sheets

(56) References Cited

U.S. PATENT DOCUMENTS

2016/0292192 A1\* 10/2016 Bhagat .................. G06F 16/258
2018/0336230 A1\* 11/2018 Transier ................ G06F 16/285
2020/0218713 A1\* 7/2020 Burns ................... G06F 16/211

\* cited by examiner

EFFICIENT STORAGE OF KEY-VALUE DATA WITH SCHEMA INTEGRATION

FIELD

The field relates generally to information processing systems, and more particularly to storage in such systems.

BACKGROUND

Cloud-based data monitoring systems provide tools for real-time performance and capacity analysis of storage systems. Such tools are helpful, for example, to identify anomalies, expedite troubleshooting, and predict capacity consumption. Such monitoring systems evaluate metrics data generated by, for example, hardware products and/or software products of storage systems. Some of these monitoring systems use a generic key-value based storage approach for large amounts of metrics data, where metrics data samples are typically collected at very small intervals and retained for long periods of time. This approach is flexible and scalable but is inefficient from a storage perspective as the keys need to be duplicated for every interval sample.

SUMMARY

Illustrative embodiments of the disclosure provide efficient storage techniques for key-value data with schema integration. An exemplary computer-implemented method includes obtaining a metrics data message associated with a product, wherein the metrics data message has a first format and comprises a schema version and a type of the product; identifying one of a plurality of schema definitions for the metrics data message based at least in part on the schema version and the type of the product; converting the metrics data message into a second format based on the identified schema definition, wherein the second format removes at least some redundant data from the metrics data message; and storing the converted metrics data message in a metrics database.

Illustrative embodiments can provide significant advantages relative to conventional data monitoring techniques. For example, certain inefficiencies associated with generic key-value based storage techniques are overcome in one or more embodiments by efficiently mapping one or more metrics data messages with an associated schema definition and eliminating repeated key names and/or additional redundant information.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
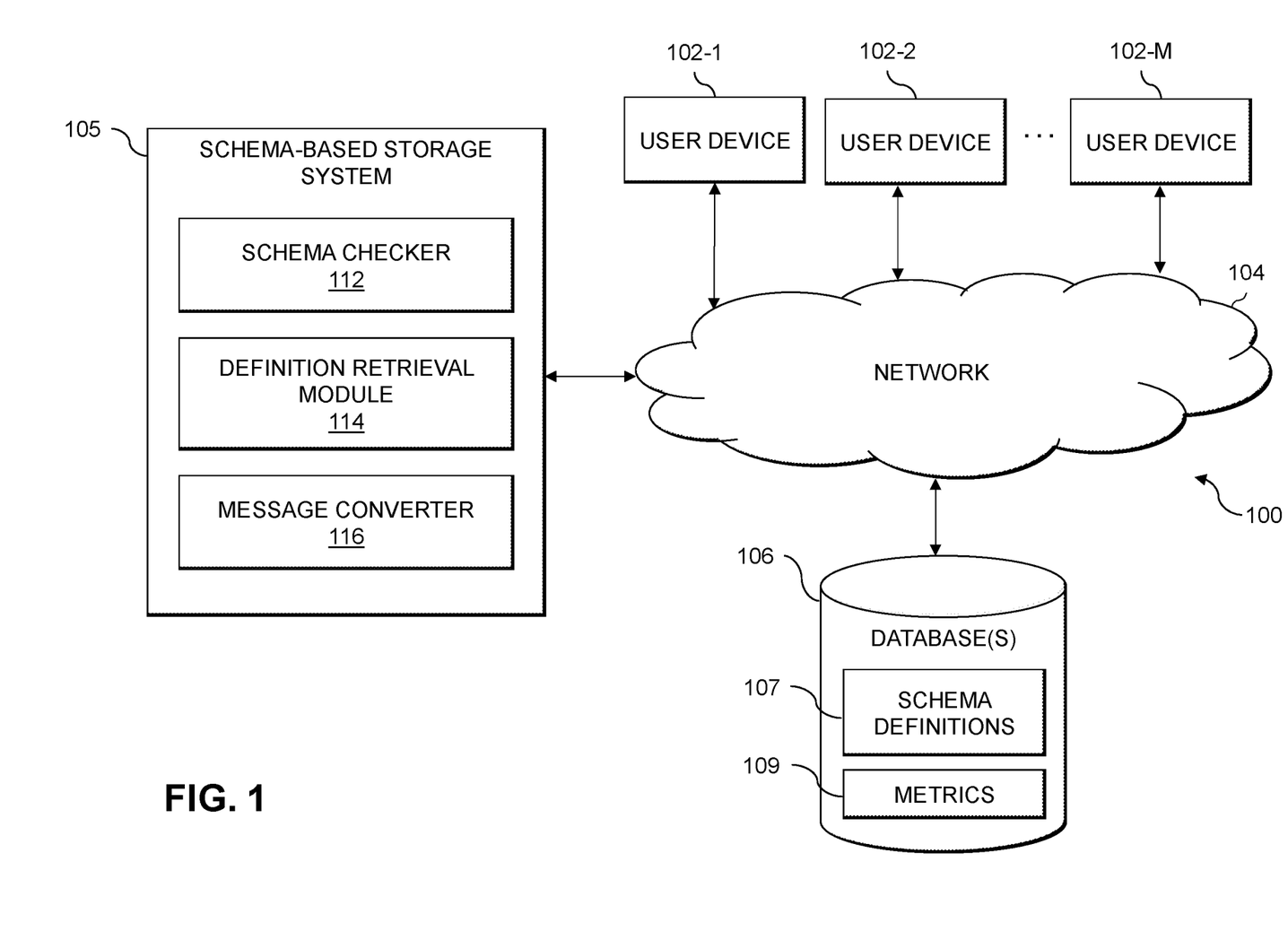
FIG. 1 shows an information processing system configured for efficient storage of key-value data with schema integration in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is schema-based storage system 105.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, schema-based storage system 105 can be associated with one or more database(s) 106 configured to store data pertaining to schema definitions 107 and/or metrics 109.

An example database 106, such as depicted in the present embodiment, can be implemented using one or more storage systems associated with the schema-based storage system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with schema-based storage system 105 are one or more input-output devices, which illustratively comprise keyboards, displays or other types of input-output devices in any combination. Such input-output devices can be used, for example, to support one or more user interfaces to schema-based storage system 105, as well as to support communication between schema-based storage system 105 and other related systems and devices not explicitly shown.

Additionally, schema-based storage system 105 in the FIG. 1 embodiment is assumed to be implemented using at least one processing device. Each such processing device generally comprises at least one processor and an associated memory, and implements one or more functional modules for controlling certain features of schema-based storage system 105.

More particularly, schema-based storage system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows schema-based storage system 105 to communicate over the network 104 with the user devices 102, and illustratively comprises one or more conventional transceivers.

The schema-based storage system 105 further comprises a schema checker 112, a definition retrieval module 114, and a message converter 116.

It is to be appreciated that this particular arrangement of modules 112, 114 and 116 illustrated in the schema-based storage system 105 of the FIG. 1 embodiment is presented by way of example only, and alternative arrangements can be used in other embodiments. For example, the functionality associated with the modules 112, 114 and 116 in other embodiments can be combined into a single module, or separated across a larger number of modules. As another example, multiple distinct processors can be used to implement different ones of the modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for efficient storage of key-value data with schema integration involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the schema-based storage system 105 and database(s) 106 can be on and/or part of the same processing platform.

An exemplary process utilizing modules 112, 114 and 116 of an example schema-based storage system 105 in computer network 100 will be described in more detail with reference to the flow diagram of FIG. 4.

As noted herein, conventional monitoring systems that collect key-value data are inefficient from a storage perspective as the keys need to be duplicated for every metrics data interval sample. Accordingly, at least one embodiment includes techniques for compacting messages by mapping each of the messages with an associated schema definition, thereby eliminating repeating key names or other redundant information. The schema definition may describe, for example, the order of keys along with a name, a data type, one or more limits, and a schema version. The techniques described herein can provide significant space savings (e.g., 40% relative to generic key-value based storage) and can significantly improve persistent and data retrieval performance due to the decreased message sizes.

Figure 2:
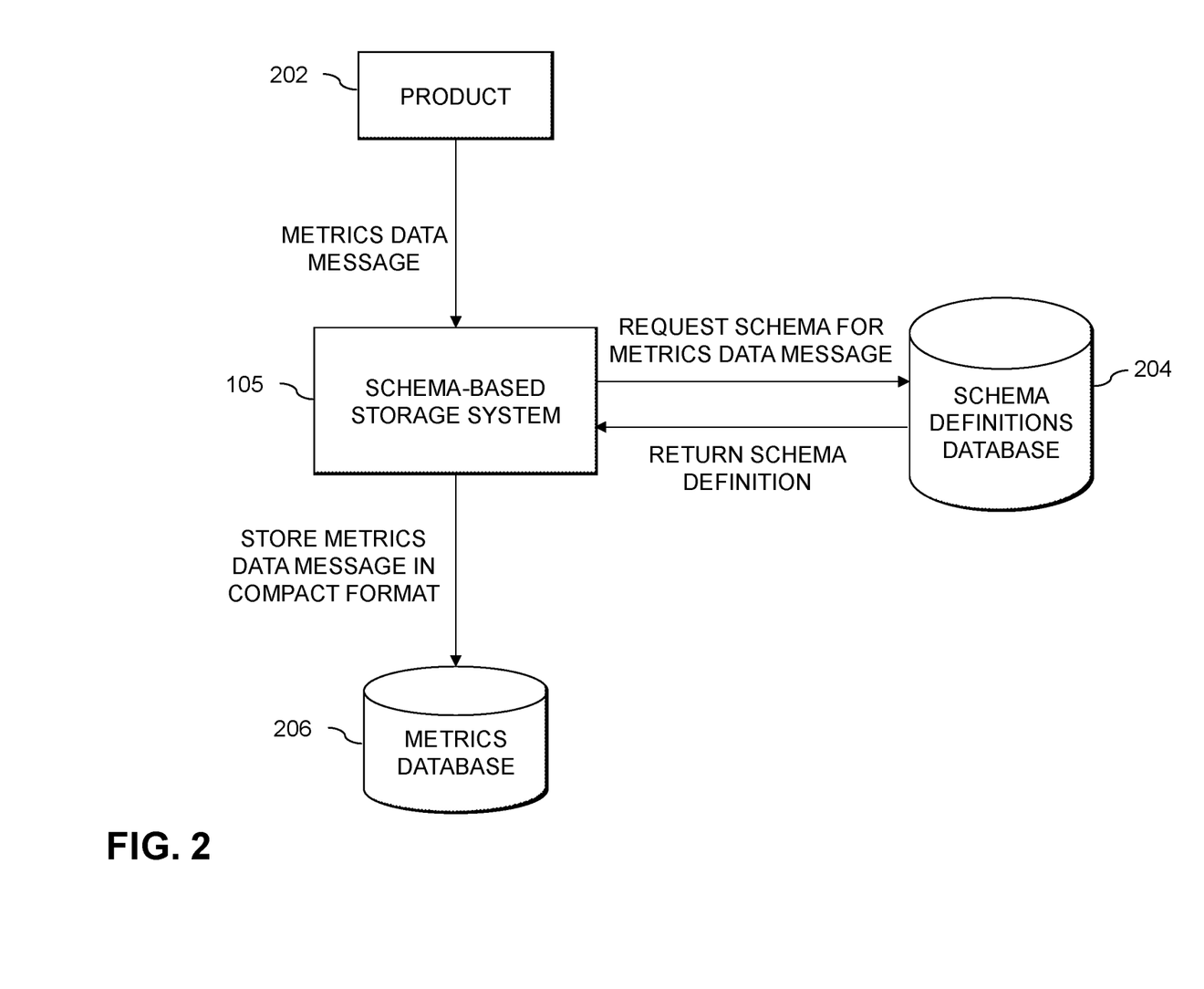
FIG. 2 shows an example architecture in an illustrative embodiment.

FIG. 2 shows a workflow diagram for efficient storage of key-value data with schema integration techniques in an illustrative embodiment. By way of illustration, the workflow diagram in FIG. 2 includes a schema-based storage system 105, a product 202 associated with, e.g., one or more of user devices 102, a schema definitions database 204, and a metrics database 206. Such an embodiment includes the product 202 transmitting a metrics data message to the schema-based storage system 105. The schema-based storage system 105 identifies a schema associated with the metrics data message. For example, the schema-based storage system 105 may identify the schema based on information included in the metrics data message such as a metric type, a schema version, and one or more data fields. The schema-based storage system 105 then requests a schema definition for the identified schema from the schema definitions database 204. The schema definitions database 204 returns the schema definition. The schema-based storage system 105 then converts the metrics data message using the schema definition into a compact format (as described in more detail elsewhere herein) and stores it in the metrics database 206.

Figure 3A:
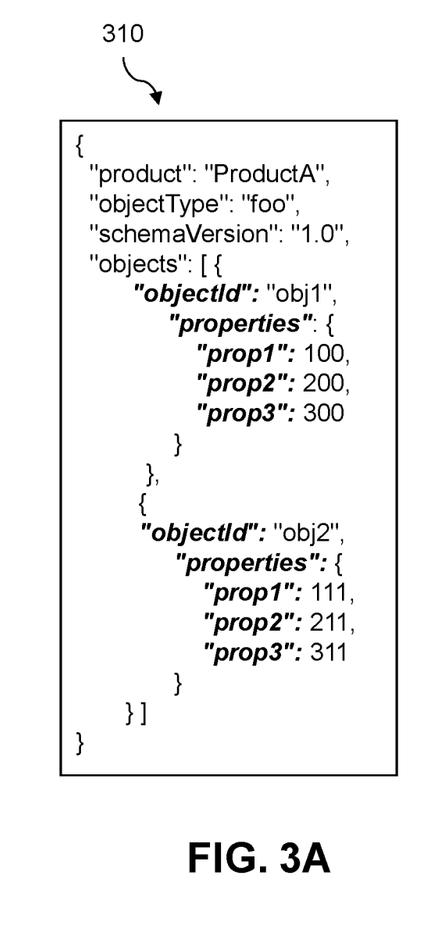
FIG. 3A shows an example of a metrics data message in an illustrative embodiment.
Figure 3B:
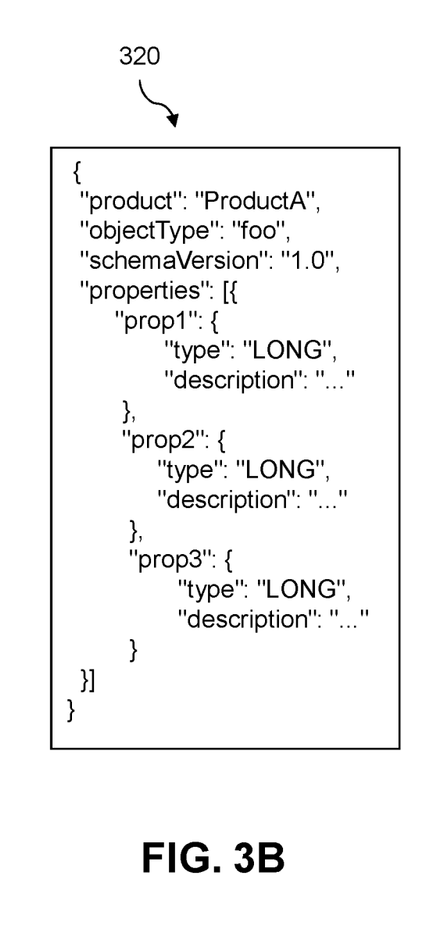
FIG. 3B shows an example of a schema definition in an illustrative embodiment.
Figure 3C:
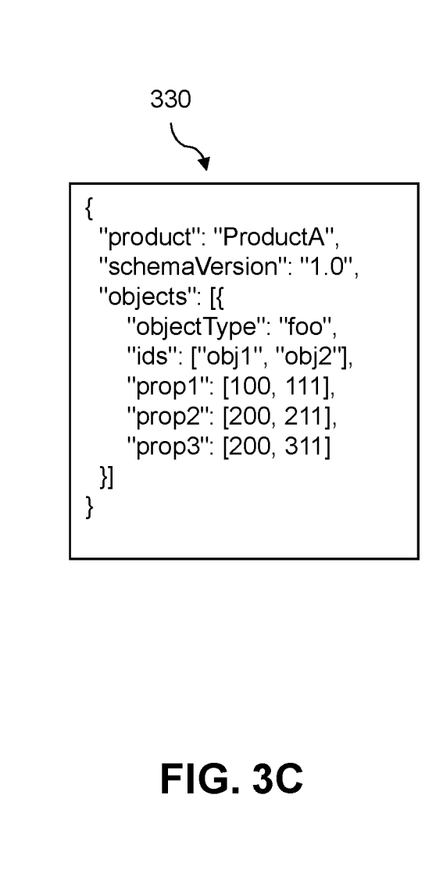
FIG. 3C shows an example of compact metrics data message in an illustrative embodiment.

FIGS. 3A-3C show examples of a metrics data message 310, a schema definition 320, and a compact metrics data message 330, respectively, in accordance with illustrative embodiments.

In the FIG. 3A example, the metrics data message 310 includes information that identifies a product type ("ProductA"), an object type ("foo"), and a schema version ("1.0"). The metrics data message 310 also includes two objects ("obj1" and "obj2"), which each include three properties named "prop1", "prop2", and "prop3". It is noted that the value of each property in "obj1" is different than the corresponding value in "obj2". The emphasized text in FIG. 3A corresponds to parts of the metrics data message 310 that are redundant.

The schema definition 320 in FIG. 3B corresponds to the metrics data message 310. For example, the schema definition 320 may be stored in a schema definition database and may be retrieved based on the data in the metrics data message 310, as described above in conjunction with FIG. 2, for example. In this example, the schema definition 320 includes the type of the product, the object type, the schema version, the object type, the names and order of the properties corresponding to an object having the object type. Optionally, the schema definition may include descriptions that describe each of the properties.

The schema definition 320 can be applied to the metrics data message 310 to obtain the compact metrics data message 330, which eliminates at least some of the redundant parts of the metrics data message 310. Applying the schema definition 320 to the metrics data message 310 may include obtaining the properties from the schema definition 320, and for each property, reading the values corresponding to that property from each object in the metrics data message 310. The values for that property are then combined into an array and inserted into the compact metrics data message 330. In the example shown in FIGS. 3A-3C, the metrics data message 310 includes two instances of the name "prop1" corresponding to the two objects ("obj1" and "obj2"). An array including the values for "prop 1" for each of these objects are inserted as an array into the compact metrics data message 330. As such, the compact metrics data message 330 includes only a single instance of the name "prop1". The other redundant parts from metrics data message 310 are eliminated in a similar manner, as shown in FIG. 3C. The term "product" as used herein is intended to be broadly construed, so as to encompass, for example, any product that generates key-value metrics data. By way of example, a product may include hardware and/or software related to a type of networking product, a type of storage product, and/or a type of computing product.

As a non-limiting example, a given metrics data message may be generated by a particular type of storage array (e.g., a storage array of a SAN), and the metrics data message may include performance metrics for a particular time interval (e.g., five minute interval). The performance metrics may relate, for example, to read operations and/or write operations performed by the storage array, a number of blocks written by the storage array during the time interval, and/or capacity usage data including, e.g., an amount of used disk space or an amount of free disk space.

In at least some example embodiments, a graphical user interface (GUI) is provided that allows a user to interact with and/or monitor at least a portion of the data stored in the metrics database 109. For example, the GUI may generate graphical representations of one or more performance metrics for one or more product types in response to user input. Additionally, some example embodiments include analyzing one or more portions of the metrics database, for example, to detect performance anomalies with one or more products or generate data capacity predictions. The results of such an analysis may then be used to dynamically adjust a configuration of a computing environment associated with the product(s). As an example, if a product corresponds to a storage product, the analysis may indicate that a storage device is nearing capacity or underperforming, and direct future data to be written to another storage device.

Figure 4:
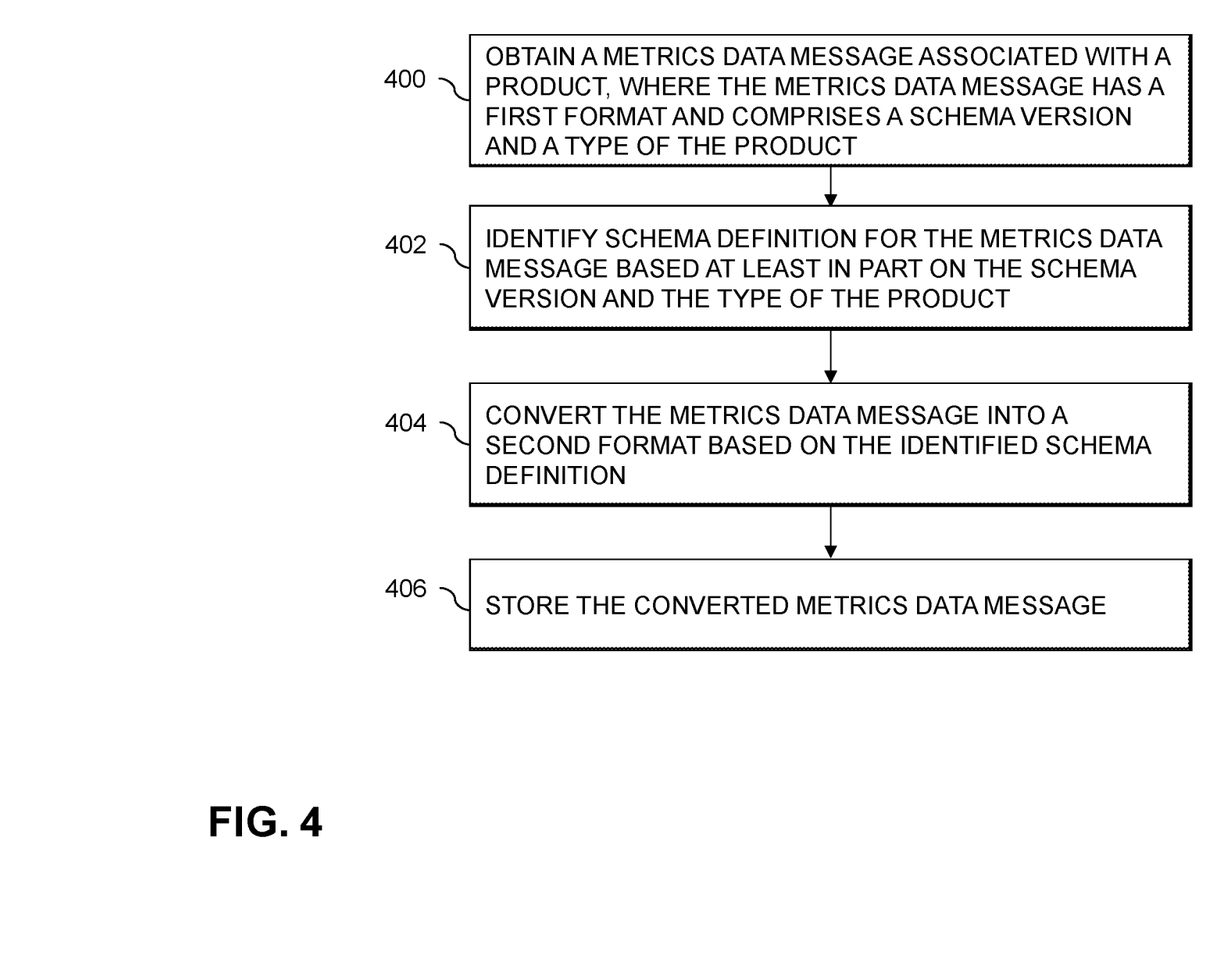
FIG. 4 is a flow diagram of an efficient storage process for key-value data in an illustrative embodiment.

FIG. 4 is a flow diagram of a process for efficient storage of key-value data with schema integration in an illustrative embodiment. It is to be understood that this particular process is only an example, and additional or alternative processes can be carried out in other embodiments.

In this embodiment, the process includes steps 400 through 406. These steps are assumed to be performed by the schema-based storage system 105 utilizing its modules 112, 114, and 116.

Step 400 includes obtaining a metrics data message associated with a product, wherein the metrics data message has a first format and comprises a schema version and a type of the product.

Step 402 includes identifying one of a plurality of schema definitions for the metrics data message based at least in part on the schema version and the type of the product.

Step 404 includes converting the metrics data message into a second format based on the identified schema definition, wherein the second format removes at least some redundant data from the metrics data message.

Step 406 includes storing the converted metrics data message, e.g., in a metrics database.

The metrics data message may include an object type; and one or more objects corresponding to the object type. The identifying of step 402 may be further based on the object type. Each of the one or more objects may include: a name for each of one or more properties associated with the object type; and a value for each of the one or more properties. The identified schema definition may define an order of the one or more properties within the one or more objects.

The redundant data may include multiple instances of the name for a given one of the properties across at least two of the objects of the metrics data message. The converting of step 404 may include mapping the value from each of the at least two objects for the given one of the properties to a single instance of the name for the given one of the properties. The plurality of schema definitions may be defined based on at least one of: a plurality of product types; a plurality of schema versions; and a plurality of object types.

The techniques depicted in FIG. 4 can also include monitoring the metrics database; and adjusting a configuration of a computing environment comprising the product based on the monitoring. The product may include at least one of: a storage product, a storage area network product, and a converged product. A converged product may include hardware components (e.g., compute, storage and/or networking components) and/or software components (e.g., management software) that are unified into a single product, for example. Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to efficiently map a data message with an associated schema definition to eliminate repeating key names. These and other embodiments can effectively overcome problems associated with storage inefficiencies associated with generic key-value based storage techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
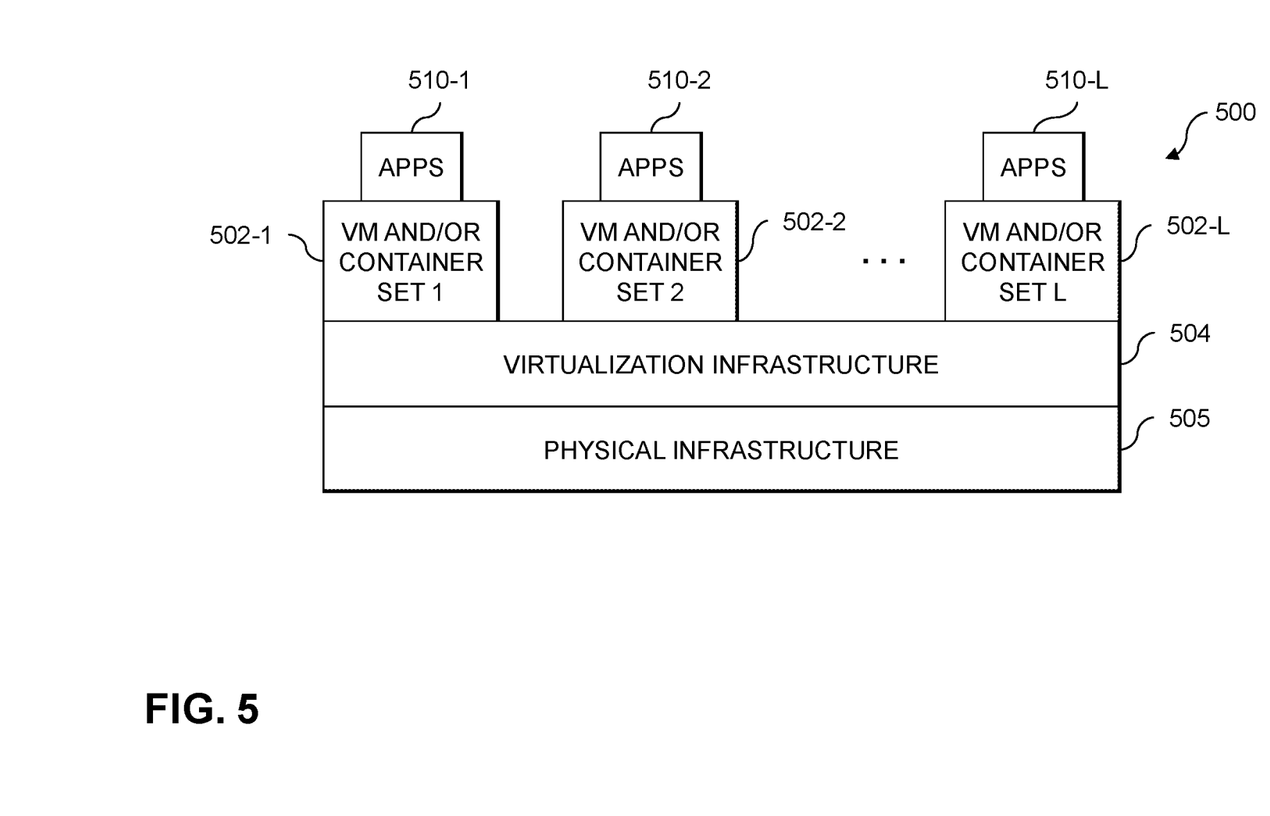
FIGS. 5 and 6 show examples of processing platforms that may be utilized to implement at least a portion of an information processing system in illustrative embodiments.
Figure 6:
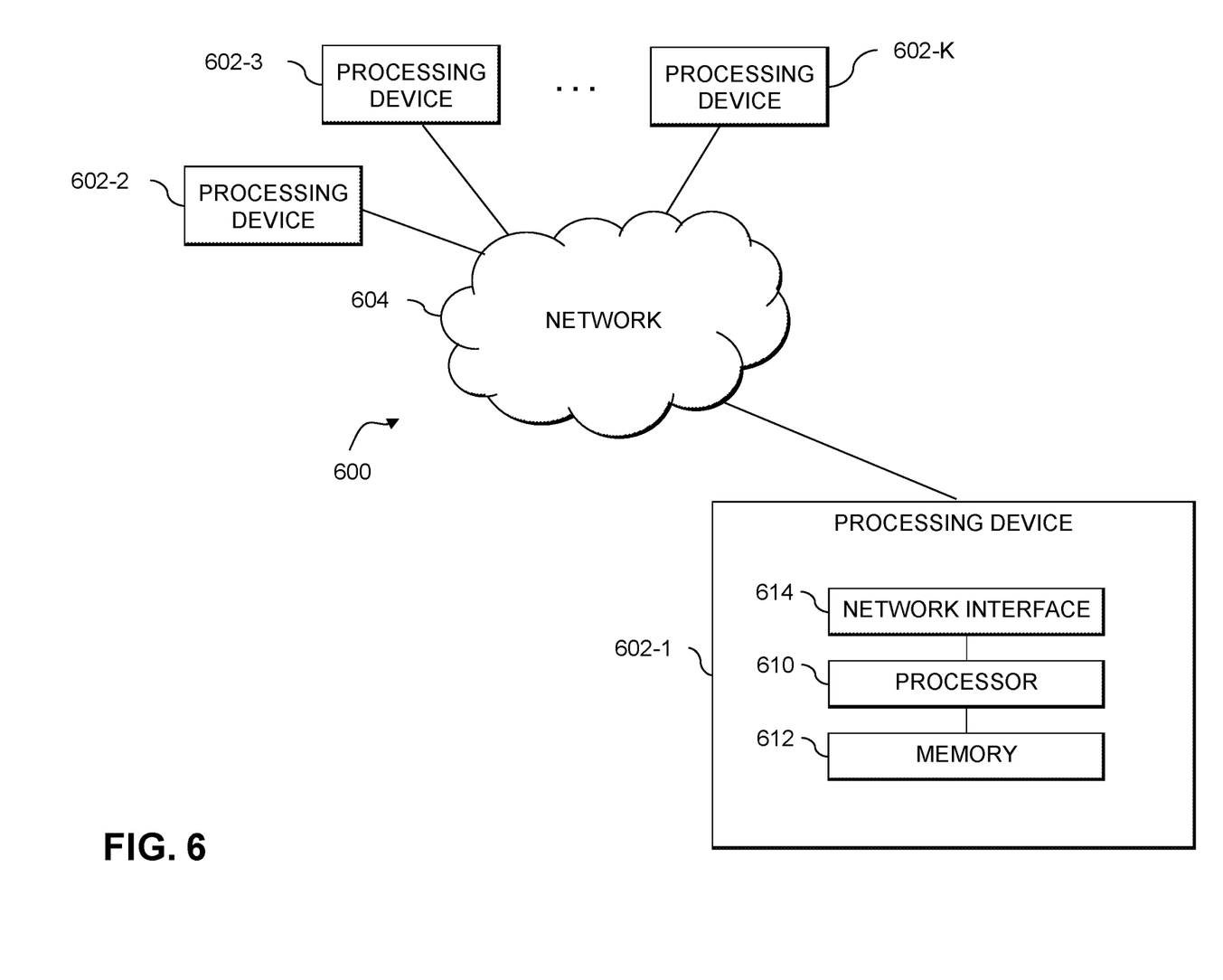

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an ASIC, a FPGA or other type of processing circuitry, as well as portions or combinations of such circuitry elements.

The memory 612 comprises RAM, ROM or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining a metrics data message associated with a product, wherein the metrics data message has a first format and comprises a schema version, a type of the product, and two or more objects comprising respective values for a given property of one or more properties related to the product, and respective object identifiers of the two or more objects;
identifying a schema definition for the metrics data message based at least in part on the schema version and the type of the product;
retrieving the identified schema definition from a schema definition database, wherein the schema definition comprises a plurality of schema definitions for a plurality of products;
converting the metrics data message into a second format based on the identified schema definition to reduce a size of the metrics data message, wherein the second format removes at least some repetitive data from the metrics data message by mapping at least the respective object identifiers and the respective values from the two or more objects for the given property in the first format to a single object in the second format;
storing the converted metrics data message in a metrics database; and
initiating an adjustment to a computing environment comprising the product based at least in part on the converted metrics data message stored in the metrics database, wherein the adjustment adjusts a utilization of the product within the computing environment;
wherein the method is performed by at least one processing device comprising a processor coupled to a memory.

2. The computer-implemented method of claim 1, wherein the metrics data message further comprises:
an object type, wherein the two or more objects correspond to the object type.

3. The computer-implemented method of claim 2, wherein the identifying is further based on the object type.

4. The computer-implemented method of claim 2, wherein each of the two or more objects comprises:
a name for each of the one or more properties associated with the object type; and
a value for each of the one or more properties.

5. The computer-implemented method of claim 4, wherein the identified schema definition defines an order of the one or more properties within the two or more objects.

6. The computer-implemented method of claim 4, wherein the at least some repetitive data comprises multiple instances of the name for at least the given property across the two or more objects of the metrics data message, and wherein the mapping comprises:
mapping the respective values for the given property to a single instance of the name for the given property in the single object.

7. The computer-implemented method of claim 1, wherein the plurality of schema definitions is defined based on at least one of:
   a plurality of product types;
   a plurality of schema versions; and
   a plurality of object types.

8. The computer-implemented method of claim 1, further comprising:
   monitoring the metrics database, wherein the initiating the adjustment to the computing environment is based at least in part on the monitoring.

9. The computer-implemented method of claim 8, wherein the product comprises at least one of: a storage product, a storage area network product, and a converged product.

10. The computer-implemented method of claim 1, wherein the converting comprises:
    using the schema definition to extract, from the two or more objects, the respective object identifiers and the respective values for the given property.

11. The computer-implemented method of claim 1, wherein the adjustment to the computing environment comprises redirecting one or more requests associated with the product to at least one other product within the computing environment.

12. A non-transitory processor-readable storage medium having stored therein program code of one or more software programs, wherein the program code when executed by at least one processing device causes the at least one processing device:
    to obtain a metrics data message associated with a product, wherein the metrics data message has a first format and comprises a schema version, a type of the product, and two or more objects comprising respective values for a given property of one or more properties related to the product, and respective object identifiers of the two or more objects;
    to identify a schema definition for the metrics data message based at least in part on the schema version and the type of the product;
    to retrieve the identified schema definition from a schema definition database, wherein the schema definition comprises a plurality of schema definitions for a plurality of products;
    to convert the metrics data message into a second format based on the identified schema definition to reduce a size of the metrics data message, wherein the second format removes at least some repetitive data from the metrics data message by mapping at least the respective object identifiers and the respective values from the two or more objects for the given property in the first format to a single object in the second format;
    to store the converted metrics data message in a metrics database; and
    to initiate an adjustment to a computing environment comprising the product based at least in part on the converted metrics data message stored in the metrics database, wherein the adjustment adjusts a utilization of the product within the computing environment.

13. The non-transitory processor-readable storage medium of claim 12, wherein the metrics data message further comprises:
    an object type, wherein the two or more objects correspond to the object type.

14. The non-transitory processor-readable storage medium of claim 13, wherein the identifying is further based on the object type.

15. The non-transitory processor-readable storage medium of claim 13, wherein each of the two or more objects comprises:
    a name for each of the one or more properties associated with the object type; and
    a value for each of the one or more properties;
    wherein the identified schema definition defines an order of the one or more properties within the two or more objects.

16. The non-transitory processor-readable storage medium of claim 15, wherein the at least some repetitive data comprises multiple instances of the name for at least the given property across the two or more objects of the metrics data message, and wherein the mapping comprises:
    mapping the respective values for the given property to a single instance of the name for the given property in the single object.

17. An apparatus comprising:
    at least one processing device comprising a processor coupled to a memory;
    the at least one processing device being configured:
       to obtain a metrics data message associated with a product, wherein the metrics data message has a first format and comprises a schema version, a type of the product, and two or more objects comprising respective values for a given property of one or more properties related to the product, and respective object identifiers of the two or more objects;
       to identify a schema definition for the metrics data message based at least in part on the schema version and the type of the product;
       to retrieve the identified schema definition from a schema definition database, wherein the schema definition comprises a plurality of schema definitions for a plurality of products;
       to convert the metrics data message into a second format based on the identified schema definition to reduce a size of the metrics data message, wherein the second format removes at least some repetitive data from the metrics data message by mapping at least the respective object identifiers and the respective values from the two or more objects for the given property in the first format to a single object in the second format;
       to store the converted metrics data message in a metrics database; and
       to initiate an adjustment to a computing environment comprising the product based at least in part on the converted metrics data message stored in the metrics database, wherein the adjustment adjusts a utilization of the product within the computing environment.

18. The apparatus of claim 17, wherein:
    the metrics data message further comprises an object type, wherein the two or more objects correspond to the object type; and
    the identifying is further based on the object type.

19. The apparatus of claim 18, wherein each of the two or more objects comprises:
    a name for each of the one or more properties associated with the object type; and
    a value for each of the one or more properties.

20. The apparatus of claim 19, wherein the identified schema definition defines an order of the one or more properties within the two or more objects.

* * * * *